(12) United States Patent
Perry et al.

(10) Patent No.: US 8,893,023 B2
(45) Date of Patent: *Nov. 18, 2014

(54) METHOD AND SYSTEM FOR PREDICTING TEXT

(75) Inventors: Hagit Perry, Herzilya (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 464 days.

This patent is subject to a terminal disclaimer.

(21) Appl. No.: 13/324,947

(22) Filed: Dec. 13, 2011

(65) Prior Publication Data

US 2012/0089925 A1    Apr. 12, 2012

Related U.S. Application Data

(60) Division of application No. 11/986,600, filed on Nov. 21, 2007, now Pat. No. 8,078,978, which is a continuation-in-part of application No. 11/975,489, filed on Oct. 19, 2007, now abandoned.

(51) Int. Cl.
| | |
|---|---|
| *G06F 3/00* | (2006.01) |
| *G06F 3/048* | (2013.01) |
| *G06F 15/18* | (2006.01) |
| *G06F 15/16* | (2006.01) |
| *G10L 15/26* | (2006.01) |
| *G06F 17/27* | (2006.01) |
| *G06F 17/24* | (2006.01) |

(52) U.S. Cl.
CPC .............. *G06F 17/24* (2013.01); *G10L 15/265* (2013.01); *G06F 17/276* (2013.01)
USPC ........... 715/752; 715/708; 715/780; 715/825; 706/21; 709/206

(58) Field of Classification Search
CPC ... G06F 17/27; G06F 17/2705; G06F 3/0237; H04M 1/72552; H04L 51/00; H04L 51/02
USPC .......................................... 715/708; 709/206
See application file for complete search history.

(56) References Cited

U.S. PATENT DOCUMENTS

| | | |
|---|---|---|
| 5,628,055 A | 5/1997 | Stein |
| 5,748,512 A | 5/1998 | Vargas |
| 6,201,867 B1 | 3/2001 | Koike |
| 6,243,578 B1 | 6/2001 | Koike |
| 6,377,965 B1 | 4/2002 | Hachamovitch et al. |
| 6,392,640 B1 | 5/2002 | Will |
| 6,690,947 B1 | 2/2004 | Tom |
| 6,898,283 B2 | 5/2005 | Wycherley et al. |

(Continued)

FOREIGN PATENT DOCUMENTS

| | | |
|---|---|---|
| EP | 1871075 A1 | 12/2007 |
| WO | 0059247 A1 | 10/2000 |
| WO | 0186922 A1 | 11/2001 |
| WO | 03103174 A1 | 12/2003 |

*Primary Examiner* — Nicholas Ulrich
(74) *Attorney, Agent, or Firm* — Soquel Group LLC

(57) ABSTRACT

A method for an electronic messager to predict text while composing a reply message, including receiving an incoming message for a user, parsing the incoming message to identify questions, phone numbers and special phrases therein, and presenting, by an electronic messager having a memory and a processor, possible responses that the user may choose from while the user replies to the incoming message, based on the questions, phone numbers and special phrases identified by the parsing.

18 Claims, 4 Drawing Sheets

(56) References Cited

U.S. PATENT DOCUMENTS

| | | |
|---|---|---|
| 7,085,542 B2 | 8/2006 | Dietrich et al. |
| 7,111,248 B2 | 9/2006 | Mulvey et al. |
| 7,149,550 B2 | 12/2006 | Kraft et al. |
| 7,194,285 B2 | 3/2007 | Tom |
| 7,360,151 B1 | 4/2008 | Froloff |
| 7,487,147 B2 | 2/2009 | Bates et al. |
| 7,610,194 B2 | 10/2009 | Bradford et al. |
| 7,630,980 B2 | 12/2009 | Parikh |
| 7,650,348 B2 | 1/2010 | Lowles et al. |
| 7,679,534 B2 | 3/2010 | Kay et al. |
| 7,778,957 B2 * | 8/2010 | Vuong .................. 707/603 |
| 7,788,327 B2 | 8/2010 | Naito et al. |
| 2004/0141004 A1 | 7/2004 | Cabezas et al. |
| 2004/0153963 A1 | 8/2004 | Simpson et al. |
| 2004/0153975 A1 | 8/2004 | Williams et al. |
| 2004/0233930 A1 | 11/2004 | Colby, Jr. |
| 2005/0070225 A1 | 3/2005 | Lee |
| 2005/0114770 A1 | 5/2005 | Sacher et al. |
| 2005/0159184 A1 | 7/2005 | Kerner et al. |
| 2005/0210115 A1 | 9/2005 | Naito et al. |
| 2005/0228774 A1 | 10/2005 | Ronnewinkel |
| 2006/0025091 A1 | 2/2006 | Buford |
| 2006/0105722 A1 | 5/2006 | Kumar |
| 2006/0241353 A1 | 10/2006 | Makino et al. |
| 2007/0004450 A1 | 1/2007 | Parikh |
| 2007/0016862 A1 | 1/2007 | Kuzmin |
| 2007/0018957 A1 | 1/2007 | Seo |
| 2007/0074131 A1 | 3/2007 | Assadollahi |
| 2007/0161404 A1 | 7/2007 | Yasujima et al. |
| 2008/0109735 A1 | 5/2008 | Vuong |
| 2008/0140886 A1 | 6/2008 | Izutsu |
| 2008/0182599 A1 * | 7/2008 | Rainisto et al. .............. 455/466 |
| 2008/0243736 A1 | 10/2008 | Rieman et al. |
| 2009/0058688 A1 | 3/2009 | Thorn |

* cited by examiner

METHOD AND SYSTEM FOR PREDICTING TEXT

CROSS REFERENCES TO RELATED APPLICATIONS

This application is a divisional of assignee's pending application U.S. Ser. No. 11/986,600, now U.S. Pat. No. 8,078,978, filed on Nov. 21, 2007, which is a continuation-in-part of assignee's application U.S. Ser. No. 11/975,489, filed on Oct. 19, 2007, now abandoned entitled METHOD AND SYSTEM FOR PREDICTING TEXT.

FIELD OF THE INVENTION

The field of the present invention is electronic messaging devices that send and receive messages.

BACKGROUND OF THE INVENTION

Electronic messaging devices, referred to as "messagers", are used to send and receive messages between users and their contacts. Many cellular phones include messagers that send and receive SMS messages. Due to their compact sizes, messagers often have limited key pads with relatively few small keys. As such, multiple key presses are often required to input a single character of text. For example, to input the character "b", a user may be required to press on a "2" key twice. Multiple key presses for single character input is a cumbersome process, and composing a 10-20 word message may take several minutes.

Predictive text technology was integrated within messagers in order to accelerate message composition. Using such technology, one or more text predictions are presented to a user, and the user may thereby input entire words by a single key press. For example, if a user has entered characters r-e-a, text predictions may include such words as "reach", "react", "read", "ready", "real", "realize" and "really". A single key press enables the user to select one of these words. Moreover, even if the user wants to input a different word then those predicted, it often saves time to select one of the predicted words that is close to the user's intended word, and to modify the text accordingly. Thus, if the user wants to input the word "realign", it is more efficient for him to select the predicted word "realize", and then backspace twice to delete the z-e and enter the characters g-n.

Prior art text prediction technology includes "dictionary based" and "non-dictionary based" prediction. Dictionary based prediction bases its prediction upon a dictionary of common words. Products that include dictionary based prediction include T9® developed by Tegic Communications of Seattle, Wash., iTap® developed by Motorola, Inc. of Schaumburg, Ill., eZiText® developed by Zi Corporation of Calgary, AB, and Adaptxt™ developed by Keypoint Technologies, Ltd. of Glasgow, Scotland. The T9 text prediction technology is described in U.S. Pat. No. 6,011,554 to King et al.

Non-dictionary based prediction bases its prediction upon statistical information for a specific language. Products that include non-dictionary based prediction include LetterWise and Wordwise developed by Eatoni Ergonomics of New York, N.Y.

SUMMARY OF THE DESCRIPTION

Aspects of the present invention concern text prediction for messagers based on a user message profile. The user message profile includes Information about messages that a user has sent and received, and personal information about the user including inter alia the user's list of contacts, the user's scheduler, and user files stored in the messager's file system.

Unlike dictionaries and language statistics, the user message profile includes information that enables a text predictor to customize its predictions for a specific user.

Aspects of the present invention also concern text prediction for composing a reply to a received message. By parsing the received message to identify special words, phrases, questions and phone numbers in the received message, a text predictor can customize a response.

There is thus provided in accordance with an embodiment of the present invention an electronic messager with a predictive text editor, including a storage unit for storing a data structure associating, for each one of a plurality of a user's contacts, usage data for the user's history of usage of words in communications with the user contact, a data manager coupled with the storage unit for generating the data structure in the storage unit, and for updating the data structure as additional communications with each user contact are performed and additional usage data is obtained therefrom, and a text predictor coupled with the storage unit, for receiving as input a character string and a designated user contact, and for generating as output an ordered list of predicted words, based on usage data in the data structure associated with the designated user contact.

There is moreover provided in accordance with an embodiment of the present invention a method for predicting text while a message is being composed, including generating a data structure associating, for each one of a plurality of a user's contacts, usage data about the user's history of usage of words in communications with the user contact, updating the data structure as additional communications with the user contact are performed and additional usage data is obtained therefrom, and predicting text while the user is composing a message, including receiving as input a character string and a designated user contact, and generating as output an ordered list of predicted words, based on usage data in the data structure associated with the designated user contact.

There is further provided in accordance with an embodiment of the present invention a method for predicting text while a reply message is being composed, including receiving an incoming message for a user, parsing the incoming message to identify questions, phone numbers and special phrases therein, and presenting possible responses that the user may choose from while the user replies to the incoming message, based on the questions, phone numbers and special phrases identified by the parsing.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to predictive text used by electronic messagers, such as mobile phones.

In accordance with the present invention, a user's messager maintains a user message profile. The user message profile includes information about incoming and outgoing message histories for each of the user's contacts. The user profile also includes the user's personal data, including inter alia the user's contact names, items in the user's scheduler, and files and file names in the messager's file system.

Figure 1:
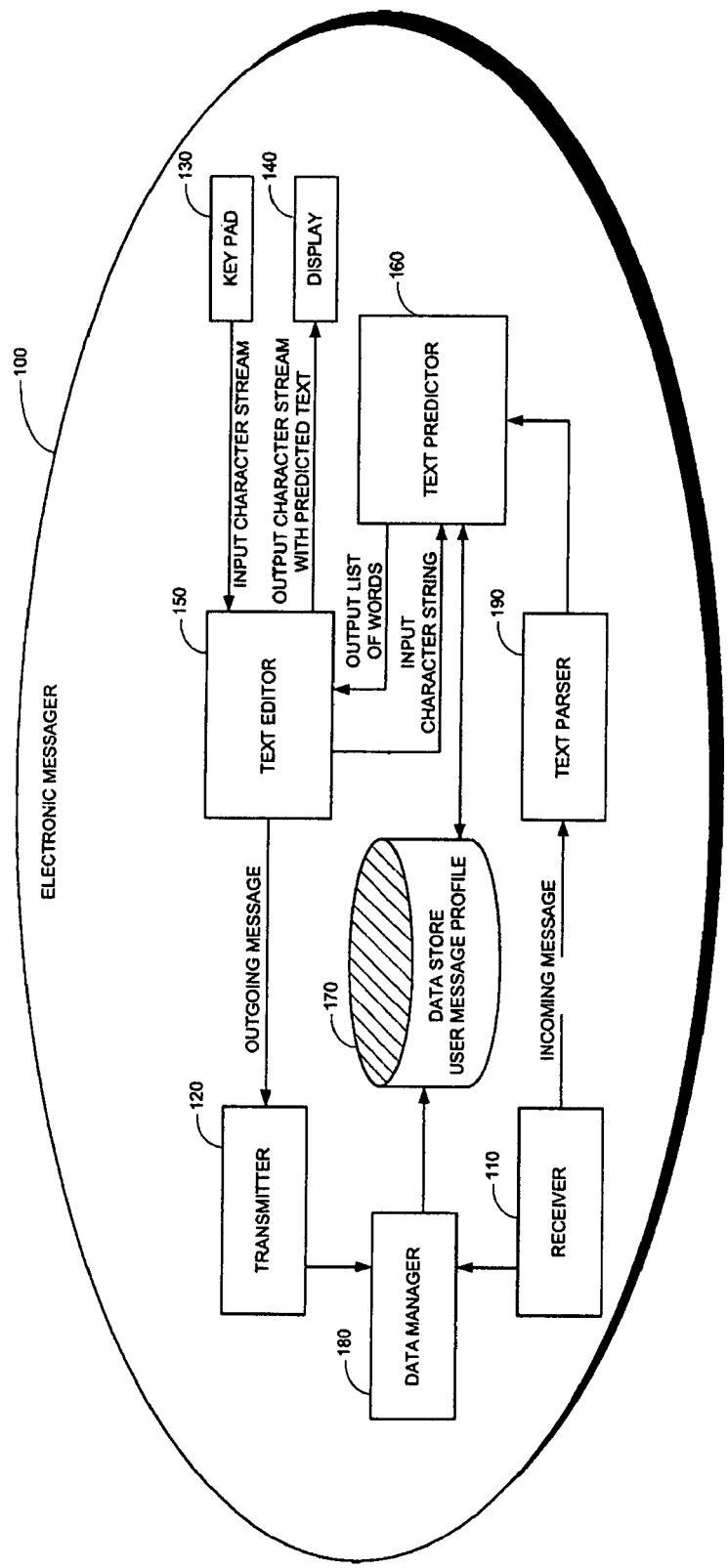
FIG. 1 is a simplified block diagram of an electronic messager with a predictive text editor, in accordance with an embodiment of the present invention.

Reference is now made to FIG. 1, which is a simplified block diagram of an electronic messager 100 with a predictive text editor, in accordance with an embodiment of the present invention. Messager 100 is used for receiving incoming messages, for sending outgoing messages, and for composing messages. As such, messager 100 includes a receiver 110, a transmitter 120, a key pad 130 for inputting characters when composing a message, and a display 140 for displaying received messages, sent messages, and messages being composed.

Messager 100 includes a text editor 150 for composing messages. Many compact messagers have limited space for only a small key pad 130 for inputting characters. As a trade-off for the compactness of key pad 130, several button presses are often required to input a single character, which is cumbersome. A user may spend several minutes composing, a short message of 10-20 words.

To speed up the process of composing messages, messager 100 includes a text predictor 160, which predicts words and phrases based on characters that were input. For example, if a user has input the characters r-e-a, then text predictor 160 may provide a list of predicted words and phrases the user can select from to complete the characters, including inter alia "reach", "react", "read", "ready", "rear" and "really". The user can select one of the words in the list and thereby accelerate composing his message. In general, text predictor 160 receives a character string as input and produces on-the-fly a list of predicted words and phrases as output.

Conventional text predictors 160 use dictionaries to generate the list of predicted words and phrases. In accordance with the present invention, text predictor 160 predicts its words and phrases from a user message profile 170 generated and maintained in a storage unit of messager 100. User message profile 170 includes a data structure, such as the tree data structure described hereinbelow with reference to FIG. 4, used by text predictor 160 to generate its output list. User message profile 170 is generated and maintained by a data manager 180.

Data manager 180 regularly updates the data structure of user message profile 170 dynamically, based on incoming and outgoing messages that the user has received and sent, respectively. Data manager 180 may also update message profile 170 based on personal user information, such as a list of the user's contacts, the contents of a user's scheduler, and user files stored within messager 100.

Implementation details for text predictor 160 are described hereinbelow with reference to FIG. 4.

When the user is composing a message to a designated recipient contact, text predictor 160 bases its predictions on messages in user message profile 170 that were received from the designated contact and on messages that were sent to the designated contact, if such messages exist. If the user is composing a message to a new contact then user message profile 170 does not contain a history of messages for the new contact, and text predictor 160 bases its predictions on general messages in user message profile 170.

It will be appreciated by those skilled in the art that the data structure stored in user message profile 170 may also be populated by words detected in speech during a conversation between the user and a user's contact. Speech-to-text conversion is used to convert voice to text. Words extracted from the converted text are then added to user message profile 170.

Such speech-to-text conversion may be performed by a speech-to-text convertor component within messager 100 (not shown in FIG. 1), or via a service provided by an application server. An example of such a service is the mobile speech-to-text interface available at http://www.jott.com.

When the user is replying to a message received from a contact, text predictor 160 derives its predictions based on the contents of the received message. A text parser 190 identifies special words, phrases and questions in the received message, and text predictor 160 uses these results to present the user with reply text he can choose from. For example, if text parser 190 identifies a question beginning with "Where" in the received message, then text predictor 160 retrieves data from the user's scheduler. Thus, if the user responds to a message beginning with "Where" while the user is in a meeting that is posted in the user's scheduler as,

| | |
|---|---|
| Subject: | Meeting with John |
| Location: | My office |
| Start-Time: | Wed Oct. 17, 2007 8:00 AM |
| End-Time: | Wed Oct. 17, 2007 9:00 AM | then the predicted response takes the form "I am in a meeting with John in my office between 8:00 AM and 9:00 AM." Alternative, if text parser 190 identifies a question beginning with "Where" in the received message, then text predictor 160 presents a list of locations that user can choose from, including his home, his office and his physical location as determined by a GPS unit, in case massager 100 contains a GPS unit (not shown).

If text parser 190 identifies a question beginning with "Who" in the received message, then text predictor 160 presents a list of people the user can choose from, including his contacts.

If text parser 190 identifies a question beginning with "When" in the received message, then text predictor 160 presents text beginning with "At . . . ", and if the user chooses this text then text editor 150 automatically switches into a numeric input mode.

If text parser 190 identifies a question beginning with "Why" in the received message, then text predictor 160 presents a text reply beginning with "Since . . . " or "Because . . . "

If text parser 190 identifies a phone number in the received message, then text editor 150 enables the user to edit, save or dial the identified phone number.

If text parser 190 identifies a special phrase, such as "How are you?" in the received message, text predict 160 presents text replies beginning with "I'm fine", "I'm doing well" and "I'm tired" that the user can choose from.

Figure 2:
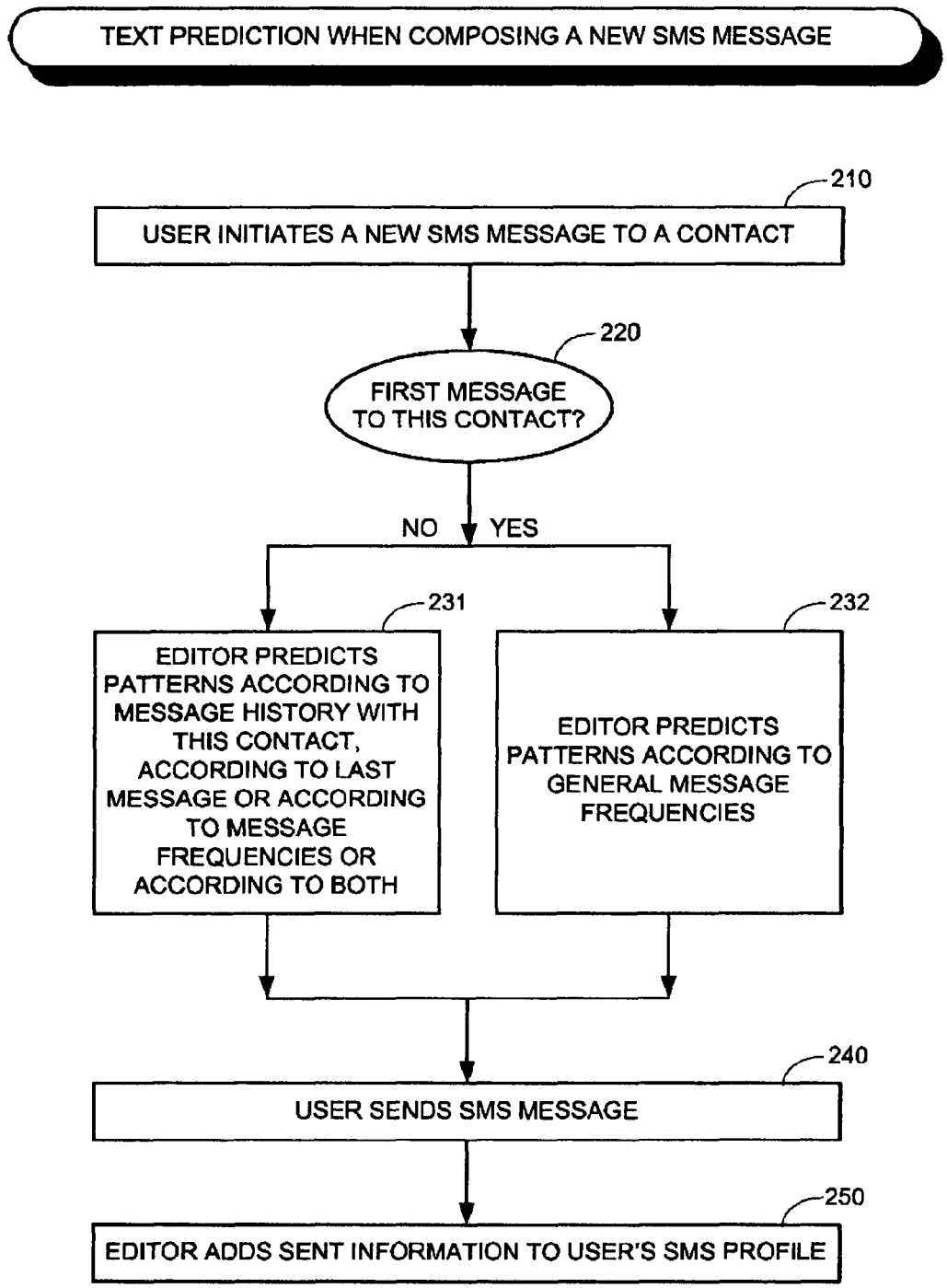
FIG. 2 is a simplified flow chart of a method for text prediction when composing a new message, in accordance with an embodiment of the present invention.

Reference is now made to FIG. 2, which is a simplified flow chart of a method for text prediction when composing a new message, in accordance with an embodiment of the present invention. At step 210 a user initiates a new message to a recipient contact, using a message editor. At step 220 a determination is made whether the user's new message is the first message the user is writing to the recipient contact. If not, then at step 231 the message editor predicts text patterns based on words in the user's message history for the recipient contact. The predicted text may be based on the most recent message sent or received from this contact, or may be based on frequencies of word occurrences in the user's overall message history for the recipient contact, or both. For example, if a first word was used 10 times, but not recently, and a second word was used 5 times and recently, then based on most recent, the second word is predicted, and based on most frequent, the first word is predicted. Based on both most recent and most frequent, a score based on these two factors is derived and the first word or the second word is predicted in accordance with their respective scores.

If the user's new message is the first message the user is writing to the recipient contact, as determined an at step 220, then at step 232 the message editor predicts text patterns based on word frequencies in the user's general message history.

Implementation details for steps 231 and 232 are described hereinbelow with reference to FIG. 4.

At step 240 the user sends his new message, and at step 250 information about the sent message is added to the user's message profile for reference when subsequently predicting text.

Figure 3:
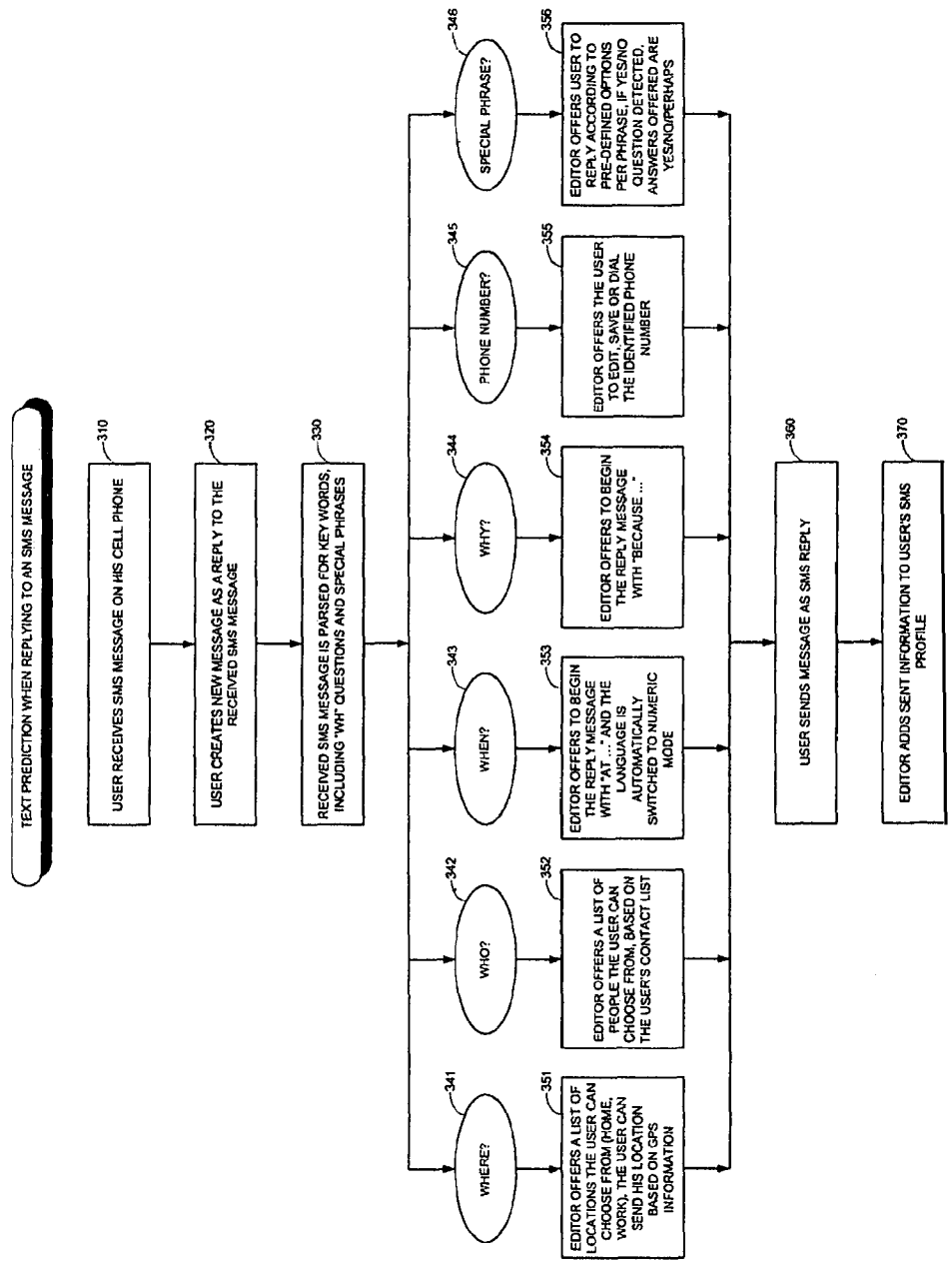
FIG. 3 is a simplified flow chart of a method for text prediction when composing a reply message, in accordance with an embodiment of the present invention.

Reference is now made to FIG. 3, which is a simplified flow chart of a method for text prediction when composing a reply message, in accordance with an embodiment of the present invention. At step 310 a user receives a message on his mobile phone, from one of his contacts. At step 320 the user initiates a new message as a reply to the message he received at step 310, using a message editor.

At step 330 the message received at step 310 is parsed for the presence of questions that begin with "Wh". In fact, because of their short lengths, many short messages such as SMS messages include questions that begin with "Where", "Who", "When" and "Why". Depending on the outcome of step 330, processing proceeds to one of the pairs of steps 341 and 351, 342 and 352, etc.

If the message received at step 310 contains a question that begins with "Where", as determined at step 341, then at step 351 the message editor offers a list of locations the user can choose from, including inter alia the user's home, the user's workplace, and the user's location as determined by GPS information. Alternatively, as described hereinabove, the message editor may generate a response based on the user's scheduler.

If the message received at step 310 contains a question that begins with "Who", as determined at step 342, then at step 352 the message editor offers a list of people the user can choose from, including inter alia the user's contacts.

If the message received at step 310 contains a question that begins with "When", as determined at step 343, then at step 353 the message editor offers to begin the reply message with "At . . . ", and the characters are automatically switched to numerical mode.

If the message received at step 310 contains a question that begins with "Why", as determined at step 344, then at step 354 the message editor offers to begin the reply message with "Because . . . ".

If the message received at step 310 contains a phone number, as determined at step 345, then at step 355 the message editor offers to save, edit or dial the identified phone number.

If the message received at step 310 contains a special phrase, as determined at step 346, then at step 356 the message editor offers to formulate the reply according to pre-defined options. For example, if the incoming message contains the phrase "How are you?", then possible replies may include "I'm fine, thanks" and "I'm tired". If the incoming message contains a yes/no question, then possible replies may include "yes", "no" and "perhaps".

At step 360 the user sends the reply message that he composed, and at step 370 information about the sent message is added to the user's message profile.

Implementation Details

Figure 4:
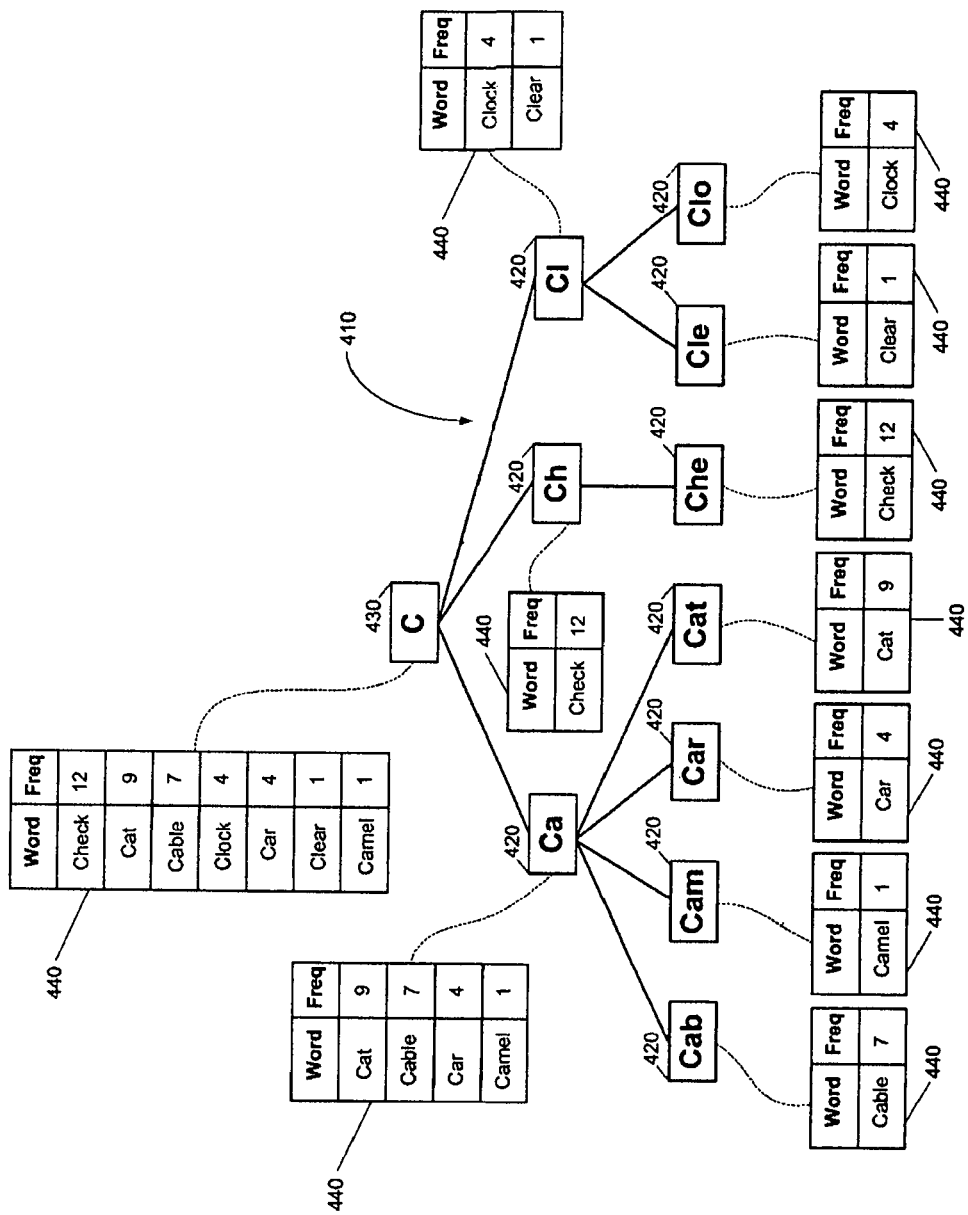
FIG. 4 is a simplified illustration of a data structure for predicting text, in accordance with an embodiment of the present invention.

Reference is now made to FIG. 4, which is a simplified Illustration of a data structure for predicting text, in accordance with an embodiment of the present invention. The data structure shown in FIG. 4 is stored in user message profile 170 of FIG. 1, and such a data structure is generated and maintained by data manager 180 for each one of a user's contacts. The data structure includes a tree 410 whose nodes 420 contain alphabetically left-to-right sorted character strings, where a parent node is a prefix of its child nodes. The root 430 of tree 410 is the character string "C", although it will be appreciated by those skilled in the art that "C" may itself be a child node, together with siblings "A", "B", "D", etc., of a parent node corresponding to an empty character string. Conversely, node 430 may not be present, and tree 410 may include three trees with respective root nodes "Ca", "Ch", "Cl".

In addition to its character string, within each node 420 of tree 410 is also stored a linked list 440 corresponding to those words that have that character string as their prefix. Each linked list 440 includes words and their frequencies of use with the specific user's contact for whom the data structure is associated with. The linked lists 440 are ordered based on frequency of use. Data manager 180 is responsible for generating and maintaining tree 410 and linked lists 440, and for dynamically updating them when new messages are sent and received to and from the specific user's contact, respectively, and new words and frequencies are derived therefrom. When a word's frequency of use changes, or when a new word is added, data manager updates tree 410 and its linked lists 440 accordingly.

As mentioned hereinabove with reference to FIG. 1, text predictor 160 operates by accepting as input a character string entered by a user, and providing on-the-fly as output a list of predicted words that have the input character string as prefix, the list being sorted according to frequency. Using the tree data structure of FIG. 4, text predictor 160 directly generates the words in the output list from the linked list 440 associated with the input character string. The output list may be empty if the input character string is not a node of tree 410. Conversely, the output list may need to be truncated if the linked list 440 is too large.

For example, If text predictor 160 receives the character string "Ca" as input, then using tree 410 it references the linked list 440 at the node for "Ca", and generates as output the ordered list of words (1) Cat, (2) Cable, (3) Car, (4) Camel. In case the output list is limited to three words, the above list is truncated to (1) Cat, (2) Cable, (3) Car.

It will be appreciated by those skilled in the art that linked lists 440 may contain pointers to words stored in memory, instead of the words themselves.

The data structure of FIG. 4 is appropriate for frequency-based sorting for the output list. If a sorting based on most recent use is desired, than linked lists 440 store a most recent date & time of use for each word, instead of a frequency of use. If a sorting based on most frequent and most recent is desired, then linked lists 440 store a score for each word entry, the score being a function of how frequently and how recently a word has been used.

It is noted that the data structure of FIG. 4 has redundancy, since each linked list 440 may be derived from the linked list of its parent node. As such, the linked list of root node 430 of tree 410 contains all of the Information necessary to generate each of the linked lists of the other nodes of tree 410.

An alternate data structure, instead of the tree structure illustrated in FIG. 4, is a tabulated dictionary of words sorted in alphabetical order, where each word entry includes a frequency and at least one date & time of use. As above, text predictor 160 operates by accepting as input a character string entered by a user, and providing as output a list of words that have the input character string as prefix, the list being sorted according to frequency. Using this dictionary data structure, text predictor 160 performs a dictionary word look-up and word sort in order to generate its output list.

For example, if text predictor 160 receives the character string "Ca" as input, then using the dictionary it looks-up the words Cable, Camel, Car and Cat, and sorts these words according to their frequencies of use; namely, (1) Cat (freq=9), (2) Cable (freq=7, (3) Car (freq=4), (4) Camel (freq=1). As above, if the output list is limited to three words, the above list is truncated to (1) Cat, (2) Cable, (3) Car.

In accordance with the present invention, such a dictionary data structure is generated and maintained for each of the user's contacts. It will be appreciated by those skilled in the art that storing tree data structures or dictionary data structures for a large number of contacts may require more memory than is available in messager 100. In such case, a first in first out (FIFO) policy is implemented to purge the oldest words and profiles in order to accommodate new words and profiles. For example, if a user has 200 contacts and if the average size of a dictionary for the contacts is 10,000 entries and if each entry requires 16 bytes of storage, then the required memory is 200*10,000*16 bytes=32 MB of storage. For messagers that include one or more GBs of memory, the required memory for the dictionaries is approximately 3% or less of the total capacity.

Comparing the tree data structure with the dictionary data structure, it will be appreciated that the data structure illustrated in FIG. 4 requires less on-the-fly processing by text predictor 160, at the expense of storing a lot of redundant data in tree 410 and at the expense of more background processing by data manager 180 to maintain tree 410 and its linked lists 440. In distinction, the alternative data structure using a dictionary uses less memory and requires less background processing by data manager 180 to maintain the dictionary, at the expense of requiring more on-the-fly processing by text predictor 160.

It will further be appreciated by those skilled in the art that various optimizations may be performed to enhance the performance of text predictor 160 and data manager 180, for both the tree data structure and the dictionary data structure embodiments. Thus, the output list of text predictor 160 may be sorted only relative to the first three characters, say, of the predicted words. Such partial sort reduces processing requirements for data manager 180 vis a vis the tree data structure, and for text predictor 160 vis a vis the dictionary data structure.

Additionally, the entries in the dictionary data structure may be pre-sorted for specific prefixes, thereby reducing on-the-fly processing requirements for text predictor 160 vis a vis the dictionary data structure.

The present invention may be embodied as an enhancement to existing text prediction, such as T9 text prediction, by fine-tuning the prediction to each specific user contact. T9 bases its prediction on key strokes. For example, when a user presses on "228", predictions such as "Cat", "Bat", "Act" are derived, since the "2" key represents "a", "b" and "c", and the "8" key represents "t", "u" and "v". The T9 predictions may also include words that have prefixes that correspond to "228", such as "Cats", "Bats", "Actor", "Acting". The predictions are sorted by frequency of use. The present invention enhances T9 prediction inter alia by generating and sorting predictions according to frequencies of use for a specific user contact.

The present invention may also be embodied as a stand-alone text predictor. In distinction to T9, when the present invention is embodied as a stand-alone predictor, predictions are based on characters that are input, instead of key strokes per se. For example, when a user presses on "222-2", for example, corresponding to "c-a", predictions include words that have "ca" as prefix, such as "Cat", "Cable", "Car", "Camel", as in FIG. 4.

In reading the above description, persons skilled in the art will realize that there are many apparent variations that can be applied to the methods and systems described. Although the present invention has been described with reference to text messages, such as short message service (SMS) messages, it also applies to other modes of communication, including inter alia e-mail messages and multi-media messaging service (MMS) messages. The data structure in FIG. 4 may integrate combined usage histories, SMS/e-mail/MMS, for each user contact. Alternatively, separate data structures may be generated and maintained for each mode of communication, namely, an SMS usage history, an e-mail usage history and an MMS usage history; for each user contact.

In the foregoing specification, the invention has been described with reference to specific exemplary embodiments thereof. It will; however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for an electronic messager to predict text while composing a reply message, comprising:
    receiving an incoming message for a user;
    parsing the incoming message to identify questions, phone numbers and special phrases therein; and
    presenting, by an electronic messager having a memory and a processor, possible responses that the user may choose from while the user replies to the incoming message, based on the questions, phone numbers and special phrases identified by said parsing.

2. The method of claim 1 wherein said parsing identifies a question that begins with "Where", and wherein said presenting presents a list of locations the user may choose from.

3. The method of claim 1 wherein said parsing identifies a question that begins with "Where", and wherein said presenting presents a response based on entries in a user scheduler.

4. The method of claim 1 wherein said parsing identifies a question that begins with "Who", and wherein said presenting presents a list of people the user may choose from.

5. The method of claim 1 wherein said parsing identifies a question that begins with "When", and wherein said presenting presents a list of dates and times the user may choose from.

6. The method of claim 1 wherein said parsing identifies a question that begins with "When", and wherein said presenting presents a list of response words the user may choose from, the response words including "at".

7. The method of claim 1 wherein said parsing identifies a question that begins with "Why", and wherein said presenting presents a list of response words the user may choose from, the response words including "because".

8. The method of claim 1 wherein said parsing identifies the phrase "how are you".

9. The method of claim 1 wherein said parsing identifies yes/no questions.

10. An electronic messager, comprising:
a memory for storing data; and
a processor for processing data, comprising:
   a receiver for receiving an incoming message for a user;
   a parser coupled with said receiver for parsing the incoming message to identify questions, phone numbers and special phrases therein; and
   a text predictor coupled with said parser for presenting possible responses that the user may choose from while the user replies to the incoming message, based on the questions, phone numbers and special phrases identified by said parsing.

11. The electronic messager of claim 10 wherein said parser identifies a question that begins with "Where", and wherein said text predictor presents a list of locations the user may choose from.

12. The electronic messager of claim 10 wherein said parser identifies a question that begins with "Where", and wherein said text predictor presents a response based on entries in a user scheduler.

13. The electronic messager of claim 10 wherein said parser identifies a question that begins with "Who", and wherein said text predictor presents a list of people the user may choose from.

14. The electronic messager of claim 10 wherein said parser identifies a question that begins with "When", and wherein said text predictor presents a list of dates and times the user may choose from.

15. The electronic messager of claim 10 wherein said parser identifies a question that begins with "When", and wherein said text predictor presents a list of response words the user may choose from, the response words including "at".

16. The electronic messager of claim 10 wherein said parser identifies a question that begins with "Why", and wherein said text predictor presents a list of response words the user may choose from, the response words including "because".

17. The electronic messager of claim 10 wherein said parser identifies the phrase "how are you".

18. The electronic messager of claim 10 wherein said parser identifies yes/no questions.

* * * * *